Figure 1:
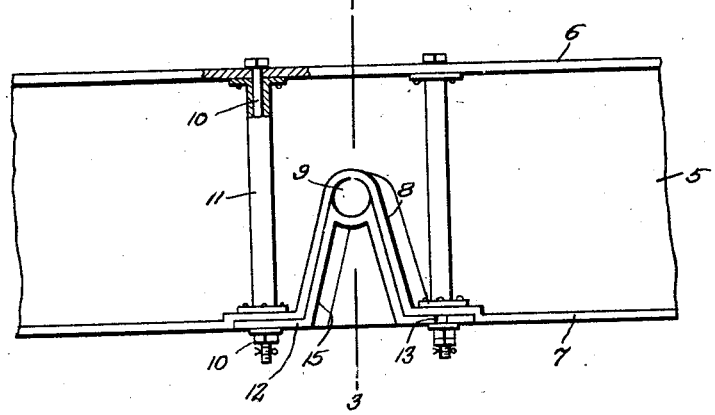

Nov. 20, 1928.

D. E. MORAN, SR 1,692,344

WHEEL FELLY

Filed June 27, 1927

Inventor,
D.E.Moran, Sr.

By Clarence A O'Brien
Attorney

Patented Nov. 20, 1928.

1,692,344

UNITED STATES PATENT OFFICE.

DANIEL E. MORAN, SR., OF MONROVIA, CALIFORNIA.

WHEEL FELLY.

Application filed June 27, 1927. Serial No. 201,884.

The present invention relates to a wheel felly and has for its prime object to provide a structure whereby demountable rims may be more easily placed thereon eliminating the necessity of lifting the heavy rim and tire in order to insert the valve stem through the felly axis now the common practice.

A further object of the invention is to provide a felly of this nature which is simple in its construction, strong and durable, inexpensive to manufacture, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 2:
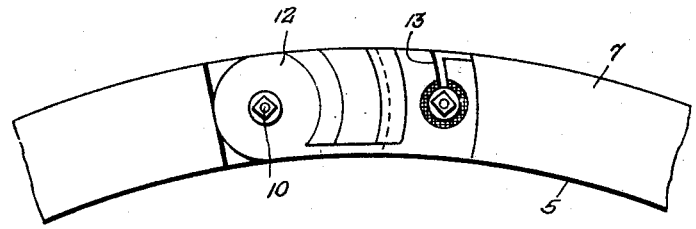
Figure 3:
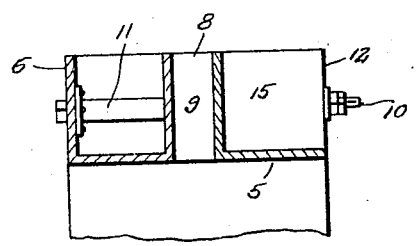

Figure 1 is a plan view of a portion of the felly showing the improved features forming the invention, Figure 2 is a side elevation thereof, Figure 3 is a detail sectional view taken substantially on the line 3—3 of Figure 1.

Referring to the drawing in detail it will be seen that the numeral 5 denotes the felly in the present instance formed with flanges 6 and 7. The flange 7 has a portion thereof directed inwardly toward the flange 6 to be somewhat V-shaped in formation as is indicated at 8 to provide the opening 9 for the reception of a valve stem. Bolts 10 extend between the flanges and have spacer sleeves 11 thereon. A pivoted member 12 is pivoted on one of the bolts and has a slot 13 to receive the other bolt so that this pivoted member may be swung in and out of the opening provided by the flange portion 8 to close the opening 9 and in order to provide this structure said member is directed inwardly to provide the filler portion 15.

With this structure it will be seen that the member 12 may be swung downwardly or inwardly of the felly and the rim may be slipped right on the felly and after the valve stem is situated in the opening 9 the filler member may be swung in position and locked therein by tightening the nuts on the bolts 10.

It is thought that the construction, utility, and advantages of this simple invention will be clearly understood without a more detailed description thereof. It is apparent that changes in the details of construction and in the arrangement of parts may be resorted to without departing from the spirit and scope of the invention as hereinafter claimed or sacrificing any of its advantages.

Having thus described my invention, what I claim as new is:—

1. In a felly having a flange, a portion of the flange being directed inwardly to form a valve stem receiving opening, and a filler member, means for pivotally mounting the filler member.

2. A felly structure of the class described comprising a pair of spaced flanges one of which has a portion directed inwardly toward the other to form a valve stem receiving opening, a member having a filler portion to close the opening, a pair of bolts between the flanges with spacer sleeves thereon, said member being pivoted on one of the bolts and having a slot to receive the other bolt.

3. A felly structure comprising a flange, a portion of said flange being directed inwardly to form part of a wall of a valve stem receiving opening, a member having a portion to form the remaining part of said wall of said opening, and means for pivotally mounting the member so that it may be swung in and out of position with respect to said flange to complete or break the wall of the opening.

In testimony whereof I affix my signature.

DANIEL E. MORAN, SR.